United States Patent
Sauer et al.

(10) Patent No.: US 8,746,657 B2
(45) Date of Patent: *Jun. 10, 2014

(54) MULTI-PIECE VALVE DISK

(75) Inventors: Martin Sauer, Altisheim (DE); Dieter Weimer, Dietzenbach (DE)

(73) Assignee: Krones AG, Neutraubling (DE)

(*) Notice: Subject to any disclaimer, the term of this patent is extended or adjusted under 35 U.S.C. 154(b) by 96 days.

This patent is subject to a terminal disclaimer.

(21) Appl. No.: 13/164,800

(22) Filed: Jun. 21, 2011

(65) Prior Publication Data

US 2012/0037832 A1 Feb. 16, 2012

(30) Foreign Application Priority Data

Jun. 21, 2010 (DE) .................. 10 2010 030 298

(51) Int. Cl.
| | |
|---|---|
| F16K 1/00 | (2006.01) |
| F16K 15/00 | (2006.01) |
| F16K 1/48 | (2006.01) |
| E03B 1/00 | (2006.01) |
| F16K 1/20 | (2006.01) |
| F16K 1/44 | (2006.01) |
| F16J 15/02 | (2006.01) |

(52) U.S. Cl.
USPC ...... 251/332; 251/357; 251/333; 137/614.11; 137/614.18; 277/644; 277/637

(58) Field of Classification Search
USPC .............. 251/332, 333, 356, 357, 358; 137/614.18, 614.11; 277/351, 353, 277/435, 438, 440, 441, 491, 497, 551, 589, 277/630, 637, 644, 944
See application file for complete search history.

(56) References Cited

U.S. PATENT DOCUMENTS

| | | | | |
|---|---|---|---|---|
| 3,149,848 | A * | 9/1964 | Galloway | 277/468 |
| 3,544,066 | A * | 12/1970 | Fawkes | 251/306 |
| 3,918,726 | A | 11/1975 | Kramer | |
| 4,113,268 | A * | 9/1978 | Simmons et al. | 277/641 |
| 4,915,355 | A * | 4/1990 | Fort | 251/357 |
| 6,202,983 | B1 * | 3/2001 | Hartman et al. | 251/306 |
| 7,513,483 | B1 * | 4/2009 | Blume | 251/332 |

FOREIGN PATENT DOCUMENTS

| | | |
|---|---|---|
| CN | 101305227 A | 11/2008 |
| DE | 2503807 A1 | 7/1975 |
| DE | 29818551 U1 | 2/1999 |
| DE | 20205467 U1 | 8/2002 |
| DE | 10147455 C1 | 4/2003 |
| DE | 202006004173 U1 | 10/2006 |
| EP | 0711940 A1 | 5/1996 |
| EP | 1730430 A1 | 12/2006 |
| WO | WO-2005098287 A1 | 10/2005 |

OTHER PUBLICATIONS

Search Report for DE 10 2010 030 298.8 dated Oct. 12, 2010.

* cited by examiner

*Primary Examiner* — John Rivell
*Assistant Examiner* — Hailey K Do
(74) *Attorney, Agent, or Firm* — Leydig, Voit & Mayer, Ltd.

(57) ABSTRACT

A multi-piece valve disk of a sliding and/or seat valve, a ring seal with an elastic sealing ring with an external sealing zone is placed in a ring groove of the valve disk onto a dimensionally stable backup ring, and where an elastic restoring region effectively positioned between the backup ring and the external sealing zone is arranged in the backup ring, the restoring region being embodied in one piece with the sealing ring of its material adjacent to the external sealing zone of the sealing ring.

12 Claims, 4 Drawing Sheets

MULTI-PIECE VALVE DISK

CROSS-REFERENCE TO RELATED APPLICATION

The present application claims the benefit of priority of German Application No. 1020030298.8, filed Jun. 21, 2010. The entire text of the priority application is incorporated herein by reference in its entirety.

FIELD OF THE DISCLOSURE

The disclosure relates to a multi-piece valve disk and a ring seal for a multi-piece valve disk such as used in product processing operations, for controlling the flow of beverages, food, pharmaceutical or biotechnical product.

BACKGROUND

In the multi-piece valve disk of a double seat valve known from DE 101 47 455 C, which comprises two valve disks each cooperating with the inner wall of a seat with a sliding valve function, the ring seal consists of three prefabricated components mounted into each other, namely of the sealing ring of an elastomeric material, the dimensionally stable backup ring, and the restoring region for the sealing ring inserted in-between, for example in the form of an O-ring. As the backup ring is supported only radially at a portion of the valve disk, the clamping width of the ring groove receiving the ring seal, which generates the preload frictional connection for the sealing ring, is only defined by the metallic contact between the parts of the valve disk screwed to each other. The backup ring is seated axially floating between the outer sides of the sealing ring. Due to the manufacturing tolerances of the valve disk parts, it is difficult in this concept to adjust a defined clamping width for the ring groove that can be exactly reproduced and is decisive for an exactly defined preload frictional connection of the sealing ring with the ring seal being mounted and for its proper functioning during the operation of the double seat valve. When the double seat valve is in operation, i.e. when the valve disk is shifted along the inner wall of the seat with the external sealing zone being dynamically deformed, when the sealing ring emerges from the seat, and when the sealing ring submerges again in the seat, in each case with a flexing deformation of the external sealing zone, inevitable relative motions between the three components occur and lead to local concentrations of friction, stress concentrations and flexing movements in the sealing ring, resulting in a limited service life of the sealing ring. These mechanical influences are even intensified by possible floating movements of the backup ring in the axial direction between the clamped outer sides of the sealing ring.

In a double seat valve known from EP 1 730 430 A, the one valve disk provides a seat valve function on a conical face of the seat, while the other, multi-piece valve disk provides a sliding valve function with an only radial sealing in the seat. The ring seal in the multi-piece valve disk consists of an elastic sealing ring with an approximately C-shaped cross-section and a backup ring with an approximately T-shaped cross-section, where the sealing ring is vulcanized onto the backup ring, such that a radial external sealing zone adjacent to the T-crossbeam of the backup ring and additionally an axial central sealing zone in the upper side of a part of the valve disk are exposed. The manufacture of the ring seal embodied as composite structure is complicated and expensive. As the sealing ring is exposed at two adjacent sealing zones, it requires the connection with the backup ring by vulcanization, as otherwise an outer side of the sealing ring could perform inadmissible relative motions during which a cleaning medium or a working medium would get behind the ring seal. However, the backup ring defines the clamping width of the ring groove as the parts of the valve disk are positively supported at the backup ring and position it axially.

It is one aspect of the disclosure to improve a multi-piece valve disk of the type mentioned in the beginning as well as a ring seal with respect to an inexpensive and easy manufacture, high functional reliability and a minimum number of components.

As the ring seal in the multi-piece valve disk only consists of two components and during the operation of the sliding and/or seat valve, relative motions thus only occur, if they do occur at all, between two components, the result is a cheaper manufacture, simple assembly, comfortable disassembly when the sealing ring, being an expendable part, is exchanged, and a higher functional reliability.

The ring seal is a functional and universal equipment component of such valve disks as the backup ring takes care of a defined positioning of the sealing ring and supports an exactly predetermined preload frictional connection.

According to the disclosure, parts of the valve disk are positively and non-positively supported at the backup ring from two sides in axial directions defined by the stroke direction of the valve disk, so that the backup ring is positioned stably and cannot perform any relative motions relative to the sealing ring. By the support of the parts at the backup ring, the clamping width of the ring groove between the parts of the valve disk generating a preload frictional connection for the sealing ring is thus defined. In this manner, a largely constant preload of the sealing ring in the ring groove can be ensured within one line of valve disks and ring seals, where manufacturing tolerances, for example of the threaded connection between the parts and/or the tightening torque of a threaded joint, do not have any influence on the preload of the sealing ring.

According to the disclosure, by a radial support at a part of the valve disk, the backup ring furthermore defines the radial position for the sealing ring generating a protrusion of the external sealing zone of the sealing ring over the valve disk, so that the backup ring can thus fulfill a further positioning function in the ring seal or the valve disk, respectively.

Corresponding to a particularly important independent idea of the disclosure, different backup rings are used which differ in that the indentation either faces radially outwards or has an axial orientation, or is even oriented obliquely outwards with axial and radial direction components. These backup rings permit to make ring seals which can be optionally used for valve disks having different valve functions, e.g. for a valve disk with an only radial sealing and a sliding valve function, a valve disk with a radial and an axial sealing with a seat valve function, or a valve disk with an only axial sealing and also with a seat valve function. The orientation of the indentation present in the different backup rings thus determines the application of the respective backup ring for the ring seal of the respective valve disk type. This idea is particularly suitably expanded by employing, independent of the embodiment of the backup ring, always the same type of sealing ring which is placed onto the two backup rings in different rotational positions, but can be produced in one and the same manufacturing mold. This philosophy of identical parts has a further advantageous influence on the producing costs at least of the sealing rings (large piece number) and thus also of different valve disks. Another advantage of this concept is that the risk of confusions during the manufacture or assembly of the valve disks and during a replacement of a backup ring is minimized as only the respective correct backup ring can be installed anyway, and the sealing rings having the same shapes and dimensions and which can be combined with the respective backup ring fit in any case.

According to the disclosure, the same type of sealing ring can be even placed onto each of the different backup rings, i.e. each of the sealing rings manufactured in the same production mold with one single specification.

As, depending on the embodiment, i.e. the shape and/or size of the respective backup ring, the placed sealing ring is optionally extended and/or rotated to a greater or lesser extent, according to the disclosure, the same type of sealing ring can be used and can be manufactured in the same production mold, but optionally with a different Shore hardness or elasticity, or from different materials. Such internal differences between the externally identical sealing rings can be easily realized in the manufacture of the sealing rings, for example in injection molding.

In one suitable embodiment, the sealing ring has two outer sides in its cross-section where preferably their thickness increases towards their free ends, so they are, for example, approximately designed like a wedge. Between the outer sides, the external sealing zone, preferably designed like a roof, is provided at the outer surface. At the inner surface, a ring groove is shaped adjacent to each outer side. Between the ring grooves, the sealing ring finally comprises at least one annular ring projecting to the inside. The annular ring can be designed with an at least partially circular cross-section. This simple cross-sectional shape of the sealing ring satisfies the different requirements in view of the sealing and working characteristics during the operation of a sliding or seat valve and can be produced at low costs. The material of the sealing ring can be an elastomer or rubber.

In one suitable embodiment, the backup ring comprises a base part limited by backup surfaces orthogonal with respect to each other, two spaced ring ribs projecting in parallel perpendicularly or obliquely from the base part and fitting into the ring grooves of the sealing ring, and the indentation between the ring ribs embodied as a ring groove. The backup ring can consist of metal or of a material that is harder than the material of the sealing ring. The indentation can be embodied as approximately rectangular ring groove, or as a semi-circularly fluted ring groove. The backup ring can be manufactured easily and at low costs. The ring seal can be comfortably mounted.

In one suitable embodiment, the ring ribs can be offset in the backup ring inwards with respect to the base part via external shoulders. With a relatively broad base part which provides high stability of the backup ring and its defined positioning, nevertheless a relatively great amount of material can be accommodated in the outer sides of the sealing ring in the ring groove and statically preloaded in this manner. Moreover, the external shoulders offer the possibility of providing clearances for the "expansion" of the outer sides of the sealing ring due to swelling and/or temperature conditions.

In another suitable embodiment, with the ring seal being mounted in the valve disk, open alternative spaces for the outer sides and/or the annular ring are provided between the parts of the valve disk lying against the backup ring and the backup ring, and optionally even in the indentation, these spaces ensuring a deformation characteristic of the sealing ring mounted under a preload which can be relatively exactly predetermined and largely remains constant despite temperature and possibly swelling influences.

To facilitate the assembly of the ring seal, in one suitable embodiment, the backup ring can be divisibly embodied of ring segments. When the sealing ring is being placed, it does not have to be expanded inappropriately, but the segments are inserted in the sealing ring and then joined inside in the sealing ring. In the mounted state, i.e. fixed by the adjoining parts of the valve disk, the divided backup ring nevertheless acts like an integral backup ring.

Due to the simple assembly of the two components resulting in the ring seal, the sealing ring can be embodied with a Shore hardness of about 85 Shore, i.e. relatively hard, whereby in the mounted state, it is largely prevented that a cleaning medium and/or an operating medium gets behind the ring seal, and/or that the latter is torn out of the ring groove.

As the demands on the sealing characteristic of the sealing ring differ in different areas of its cross-section, it can be suitable to fabricate the sealing ring with bi-injection molding technology in one piece, but with zones of different Shore hardnesses and thus elasticities, or from different materials. This two or multi-component technology is well-known and in the present case permits to individually adapt the sealing ring selectively to the requirements to be expected in the respective areas of its cross-section, e.g. to static and dynamic sealing functions.

Though the sealing ring could be adhered to the backup ring, an embodiment is preferred in which the sealing ring is attached such that it can be exchanged. This is because the sealing ring is an expendable part of the valve disk and optionally has to be exchanged, while the backup ring is kept after the sealing ring has been replaced and exactly ensures the predetermined preloading relations for the new sealing ring.

BRIEF DESCRIPTION OF THE DRAWINGS

With reference to the drawings, embodiments of the subject matter of the disclosure will be illustrated. In the drawings.

DETAILED DESCRIPTION OF THE PREFERRED EMBODIMENT

The disclosure relates to a multi-piece valve disk T with at least one ring seal R as well as this ring seal R per se. Valve disks T with at least one ring seal R are used, for example, in sliding and/or seat valves with only one or two valve disks (single sliding or seat valve), or in double seat valves with two valve disks T cooperating together with one seat. Double seat valves can work with a combination of a seat valve function and a sliding valve function, or a combination of two seat valve functions or two sliding valve functions. Such double seat valves are, for example, used for flow control for beverages, food, pharmaceutical or biotechnical products, must be optionally cleanable in a special manner, must reliably isolate flow paths from each other in the closed position and optionally avoid leakage between the flow media, and they must exclude a medium exchange between the flow paths in cleaning cycles. The principles according to the disclosure, however, can also be equally employed in other fields of application where a clearly defined, fail-safe sealing function of an inexpensively producable ring seal in a valve disk is essential.

Figure 1:
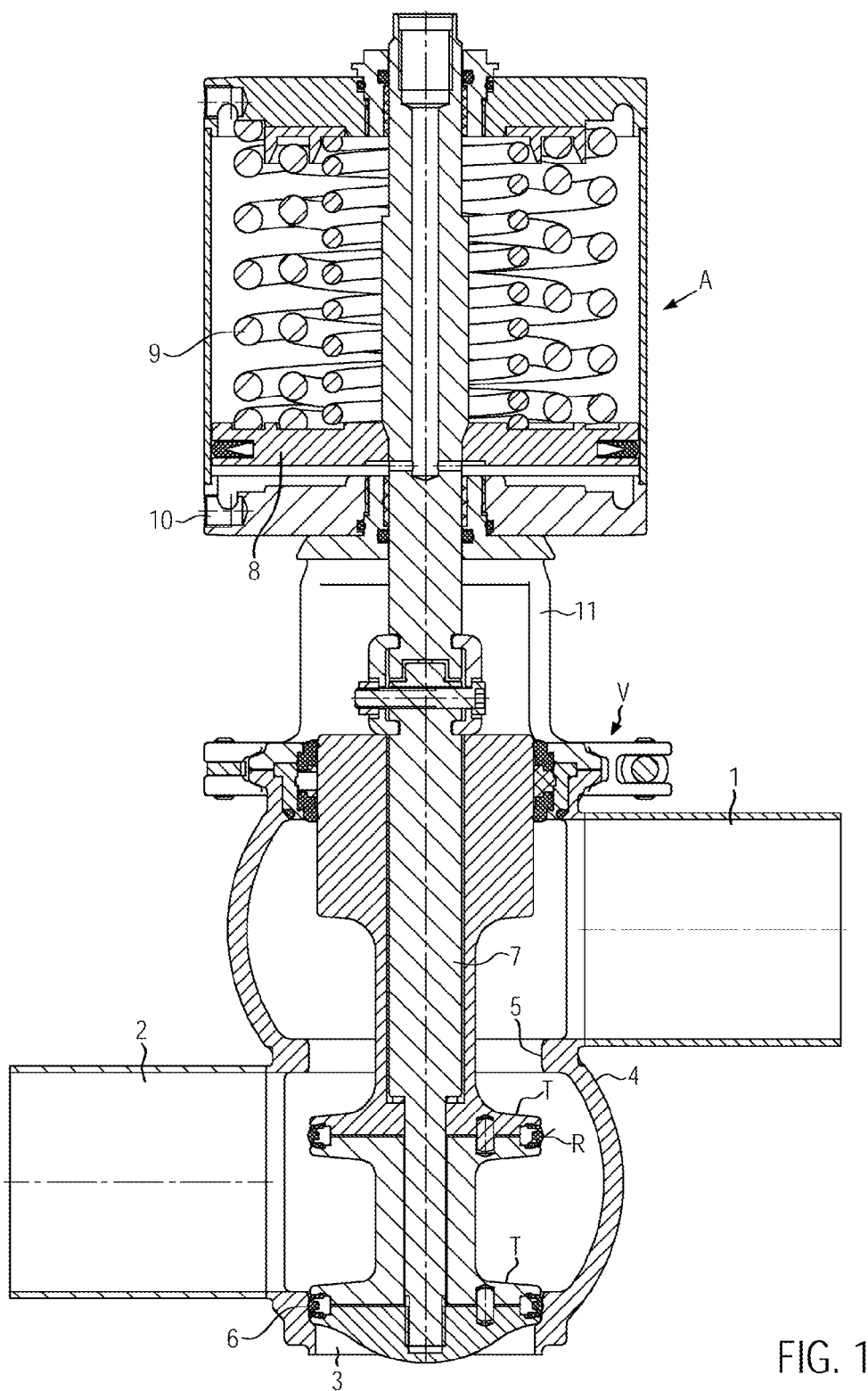
FIG. 1 shows a longitudinal section of an arrangement of a seat valve and a drive device for two valve disks of the seat valve.

FIG. 1 shows a longitudinal section of an arrangement of a drive device A and a seat valve V in one of two possible closed positions. In the seat valve V in a valve housing 4, flow paths 1, 2 and 3 are provided between each of which a here cylindrical seat 5, 6 is provided, each cooperating with one of two valve disks T which can be moved together linearly. The two valve disks T have the same diameters and are equipped e.g. with the same ring seals R which in the shown embodiment provide a merely radial sealing effect (sliding valve function) in the seat 5 or 6.

Figure 3:
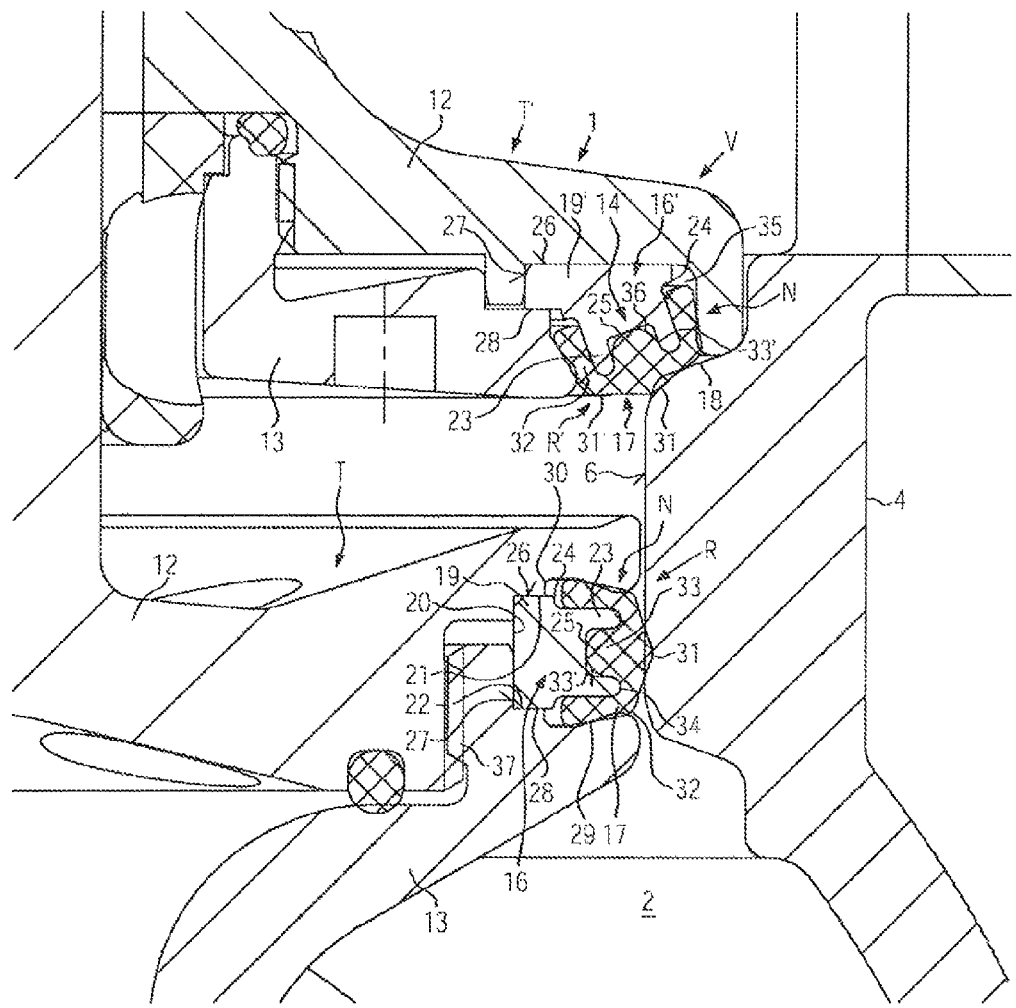
FIG. 3 shows a section of a double seat valve in the closed position.

As an alternative (not shown), in the seat valve V in FIG. 1, for example the lower valve disk T could provide a seat valve function analogous to the valve disk T of the double seat valve V in FIG. 3, which there is the upper one. Both valve disks T are screwed to a common piston rod 7 at a distance, the piston rod being connected with a piston 8 in the drive device A. Below the piston 8, a control chamber is defined which can be supplied with a pressure pulse from a connection 10. A closing spring arrangement 9 acts at the upper side of the piston 8 and adjusts the one closing position of the lower valve disk T in the seat 6 shown in FIG. 1, while the other valve disk T releases its seat 5. When a pressure acts on the piston 8, both valve disks T are lifted into the other closed position (direction of adjustment X in FIG. 4), in which the upper valve disk T closes the seat 5, while the lower valve disk T establishes a connection between the flow paths 2, 3. Each valve disk T consists at least of two parts. The ring seals R can be identical or else have different diameters. The valve housing 4 is coaxially connected with the drive device A, for example via a lantern housing 11. If the two valve disks T have different diameters, backup rings 16 with different diameters but the same cross-sections and, at least if the difference between the diameters is not too great, the same sealing rings 17, i.e. having the same shape and dimensions (one sealing ring type) can be used.

Figure 2:
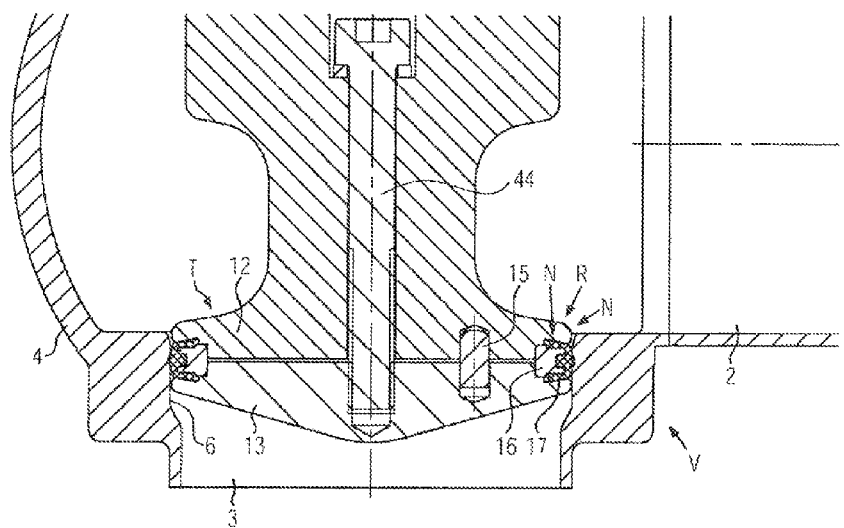
FIG. 2 shows a section of a seat valve with a valve disk in a closed position.

FIG. 2 shows a portion of a seat valve V, wherein in the valve housing 4, two flow paths 2, 3 communicate with each other via the cylindrically designed seat 6. Here, a valve disk T with a ring seal R mounted in it cooperates with the seat 6 with a radial sealing function (sliding valve function). The valve disk T consists of two parts 12, 13 which are clamped against each other via a straining screw 44 and are secured against rotation relative to each other by a centering pin 15. In the shown embodiment, the two parts 12, 13 are not clamped such that they contact each other but contact each a dimensionally stable backup ring 16 of the ring seal R which positions and supports a sealing ring 17 of an elastic material placed under a preload in a ring groove N between the parts 12, 13 of the valve disk T. The ring seal R of the backup ring 16 and the sealing ring 17 is an equipment component of the valve disk T that can be prefabricated. The sealing ring 17 is suitably attached on the backup ring 16 such that it can be replaced, but can alternatively also be adhered to it, so that in case of a replacement, only the sealing ring 17, or the backup ring 16 and the sealing ring 17 are exchanged.

FIG. 3 is a portion of an axial section of a double seat valve V with an upper and a lower valve disk T', T, each consisting of two parts 12, 13 which are clamped against each other and each against the backup ring 16, 16' of the respective ring seal R, R' via threaded joints 37. With its ring seal R' in the seat 6 between flow paths 1, 2 in the housing 4, the upper valve disk T' provides a seat valve function with an axial and a radial sealing at a conical sealing surface 18, while the lower valve disk T provides with its ring seal R a sliding valve function with an only radial sealing between the flow paths 1, 2, in the seat 6. The here e.g. upper valve disk T' could even have a merely axially acting ring seal (not shown).

The double seat valve V could also comprise two valve disks T in the seat 6 each with a ring seal R analogous to the lower valve disk T in FIG. 3 (double sliding valve function) which both seal on the same diameter or on different diameters (not shown), or two valve disks T' each with a radial and an axial sealing analogue to the upper valve disk T' in FIG. 3, then on two e.g. conical sealing surfaces 18 having different diameters in the seat 6 (double radial and axial seat valve function), or two valve disks T with ring seals R having slightly different diameters but a merely axial sealing effect with conical or radial sealing surfaces of the seat (the double axial seat valve function is not shown).

With reference to FIG. 3, the concept of the ring seal R, R' will be illustrated more in detail (also for the embodiments of the valves V in FIGS. 1, 2). Here, it should be pointed out that the ring seals R, R' comprise differently designed backup rings 16, 16', but that the sealing rings 17 used with them can be made to have the same shapes and dimensions, i.e. be produced in the same manufacturing mold and placed onto the respective backup ring 16, 16' in positions and/or expansions rotated relative to each other. As an alternative, it would be possible to use sealing rings 17 of different dimensions and/or designs each of which only matches one backup ring 16 or 16' from the beginning.

Figure 4:
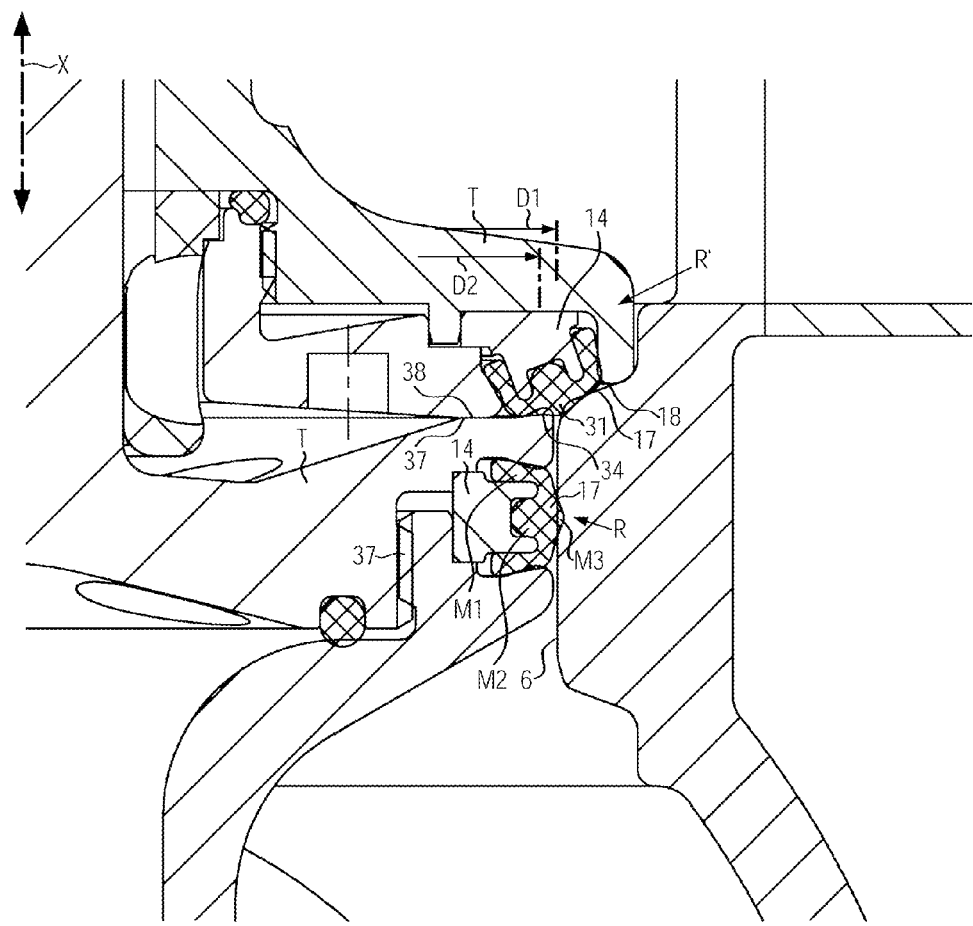
FIG. 4 shows a sectional representation of the double seat valve of FIG. 3 in an operating position e.g. shortly before the closed position is left.

The backup ring 16 of the ring seal R used in the lower valve disk T in FIGS. 3 and 4 has a broadened base part 19 which is limited at three sides by orthogonally adjoined surfaces 20, 21, 22 and is mounted such that stop faces 26 and 28 of the parts 12, 13 of the valve disk T are pressed against the stop faces 20, 22 of the base part 19 from two opposite axial sides via the threaded joint 37 between the two parts 12, 13. Thus, the backup ring 16 defines the clamping width of the ring groove N over the width of its base part 19, the clamping width generating a predetermined preload frictional connection for the sealing ring 17. Preferably, the backup ring 16 is furthermore supported with the surface 21 of the base part 19 at a radial, cylindrical surface 27 of the part 13, so that the backup ring 16 also defines the radial position of the sealing ring 17 which generates a fixed protrusion of an outside external sealing zone 31 of the sealing ring 17 over the valve disk T (for the here merely radial sealing).

Two at least essentially parallel ring ribs 23 extend perpendicularly and offset to the inside from the base part 19 at a backup part 14 of the backup ring 16 over external shoulders 24, the ring ribs including between them an indentation 25 in the form of a rounded or nearly rectangular ring groove. The sealing ring 17 positioned by the backup ring 16 in the ring groove N in the lower valve disk T has an approximately C-shaped cross-section, consists of an elastic material, such as an elastomer or rubber, and has two approximately parallel outer sides 32 which are fixed on the ring ribs 23 of the backup ring 16 between inner flanks 29 of the ring groove N with the predetermined preload frictional connection. Ring grooves 34 are shaped into the sealing ring 17 internally adjacent to the outer sides 32 and include between them an annular ring 33' projecting inwards which is made of the material of the sealing ring 17 in one piece with the latter and defines a restoring region 33 which is effectively inserted between the indentation 25 and the external sealing zone 31 and imparts a certain dynamic sealing or deformation characteristic to it.

The backup ring 16' in the upper valve disk T' in FIG. 3 differs from the backup ring 16 in the lower valve disk T in that the base part 19 is fixed with its three orthogonal adjoining limiting surfaces axially by stop faces 26, 28 and optionally radially by a stop face 27 of the parts 12, 13, where the base part 19' extends essentially radially. The ring ribs 23 lead away from the base part 19' at an oblique angle. However, the backup part 14 of the backup ring 16' has the same cross-section as the backup part 14 of the backup ring 16. The ring groove N between the two parts 12, 13 can have the same cross-section as that in the valve disk T, however it is inclined over the backup part 14 leading obliquely away from the base part 19' to create a radial and axial sealing at the conical sealing surface 18 by the sealing ring 17. The clamping width of the ring groove N is also defined in the upper valve disk T' by the backup ring 16' by the support of the parts 12, 13, i.e. here, too, there is a defined preload frictional connection of the sealing ring 17 as well as a defined protrusion of the external sealing zone 31.

In the ring seal R' (this also applies to the ring seal R) in the upper valve disk T', adjacent to the annular ring 33', clearances 36, and/or clearances 35 for the free ends of the outer sides 32 between the base part 19' and the parts 12, 13 of the valve disk T are defined. These clearances 36 and/or 35 permit expansions and contractions of the sealing ring 17 due to temperature and/or swelling.

In the embodiment shown in FIG. 3, the lower valve disk T furthermore has a surrounding sealing bead 34 at the edge of its part 12 which is intended for cooperation with a further external sealing zone 31' or a portion of the external sealing zone 31 of the sealing ring 17 in the upper valve disk T', when the double seat valve V is brought from the closed position shown in FIG. 3 to the open position by the drive device not shown in FIG. 3, where, before the upper valve disk T' is lifted, first the lower valve disk T is lifted to such an extent that the sealing bead 34 acts at the sealing ring 17 in the upper valve disk T' in a sealing manner (FIG. 4), so that, when the upper valve disk T is lifted from the conical sealing surface 18, no medium can flow from a flow path into the clearance between the two valve disks T, T' or out of it. In addition, stop faces 37, 38 can be provided at the valve disks T, T' in certain relative positions to the sealing bead 34 and the external sealing zone 31 or 31' which come into abutting contact in the valve position of FIG. 4 and define a precise, exactly reproducible sealing function between the sealing bead 34 and the external sealing zone 31 or 31'. Finally, it should be noted that in FIGS. 3 and 4, the part 12 of the upper valve disk T' (seat valve function) can be in metallic contact with the sealing surface 18 at the outer edge to ensure a defined dynamic sealing function of the sealing ring 17 at the sealing surface 18.

In the entrainment position in FIG. 4, the upper valve disk T' is finally entrained by the axial abutting contact of the stop faces 37, 38 from the lower valve disk T into the non-depicted open position in which both valve disks T, T' have exited from the seat 6.

FIG. 4 indicates, as a possible variant, that the sealing ring 17, for example in FIG. 4 the lower one, has zones M1, M2, M3 of different Shore hardnesses or/and elasticities, and was, for example, manufactured in one piece with multi-injection molding technology. Basically, a Shore hardness of about 85 Shore can be selected for the sealing ring 17, because the assembly of the ring seal R of the backup ring 16, 16' and the sealing ring 17 is simple and does not require any excessive deformations of the sealing ring 17. This relatively high Shore hardness of the sealing ring furthermore minimizes, when the ring seal R is mounted, the risk of anything getting behind the sealing ring in the ring groove N and contributes to the stability, pull out resistance and wear resistance of the sealing ring 17.

As another alternative, sealing rings 17 having the same shapes and dimensions and being manufactured in one and the same production mold can be optionally placed onto the backup ring 16' or the backup ring 16. With respect to the fact that the sealing ring 17 placed onto the backup ring 16' with the effective diameter D1 that is greater than D2 of the backup ring 16 is extended in the circumferential direction to a somewhat greater extent and rotated on the backup ring 16 relative to the sealing ring 17, the sealing ring 17 produced in the same mold can be designed with a somewhat lower Shore hardness and thus higher elasticity. To facilitate assembly and to avoid inappropriately high deformations of the sealing ring 17, the respective backup ring 16, 16' can also consist of at least two segments which are individually inserted from inside into the sealing ring 17 and joined in it.

As mentioned, the same sealing ring 17 could also be used for a backup ring of a ring seal which only provides a merely axial sealing with a seat valve function (similar to the upper ring seal R' in FIG. 3), where at the backup ring used in this case, the ring ribs 23 in turn lead upwards from the base part perpendicularly, but in parallel, to the direction of adjustment X (FIG. 4) of the valve disk, and the indentation 25 is oriented in the axial direction (not shown). Here, too, the same type of ring seal 17 could be used (philosophy of identical parts), if two valve disks T each with a merely axial sealing (double seat valve function at corresponding sealing surfaces in the seat) are attached at the backup rings differing e.g. with respect to the diameter, where the sealing ring mounted on the backup ring having the greater diameter would be extended to a somewhat greater extent than the sealing ring mounted on the backup ring having the smaller diameter.

The at least one annular ring 33' projecting inwards between the ring grooves 34 of the sealing ring 17 forms, as mentioned, the restoring region 33 of the ring seal 17 which is inserted effectively and for a dynamic sealing function of the external sealing zone 31 between the base of the indentation 25 and the ring ribs 23 of the backup ring 16, 16' and the external sealing zone 31. This restoring region 33 integrally formed in the ring seal 17 defines the e.g. dynamic deformation and sealing characteristic of the external sealing zone 31, which in the selected embodiment of the sealing ring 17 for example has a roof-like design, but could also have another surface structure. When the lower valve disk T is shifted in FIGS. 3 and 4 in the seat 6, the restoring region 33 mainly creates the radial pressing of the external sealing zone 31 against the inner wall of the seat 6, where it is supported at the base of the indentation 25 and between the ring ribs 23 at the backup ring 16, while the ring ribs 23 absorb forces in the ring grooves 34. The outer sides 32 which provide the static sealing function inside the ring groove N are kept clear from such deformations. By means of the backup ring 16 and 16', respectively, and its clamping between the parts 12, 13 of the valve disk T, in combination with the integration of the restoring region 33 into the ring seal 17, a clearly defined separation of functions of the static and dynamic functions of the ring seal 17 during the operation of the double seat valve V is achieved. This is also true for the upper ring seal R' in FIGS. 3 and 4, in which the backup ring 16' takes care of the separation of functions of the different sealing and working functions of the ring seal 17 when the external sealing zone 31 cooperates with the conical sealing surface 18, or with the sealing bead 34 of the lower valve disk T. The combination of the backup ring 16, 16' with the sealing ring 17 finally advantageously permits to embody the cross-section of the sealing ring 17 with relatively little material, whereby the tendency of the sealing ring 17 to swell when it comes into contact with media and/or to expand at higher temperatures is considerably restricted.

The invention claimed is:

1. A multi-piece valve disk of a sliding and/or seat valve for the flow control of beverages, food, pharmaceutical or biotechnical products, the valve disk being shiftable in a linear direction of adjustment in relation to a wall of a seat and comprising at least one ring seal disposed in a ring groove of the valve disk, the ring seal including:
  a backup ring including an indentation ring groove facing radially outwards or being oriented one of axially or obliquely outwards with axial and radial direction components, the indentation ring groove including a base disposed between two substantially parallel ring ribs;
  an elastic sealing ring with an approximately C-shaped cross-section including:
    an inner surface engaging the back-up ring with a positive form-fit,
    at least one external sealing zone, and
    an elastic restoring region adjacent to the at least one external sealing zone, the elastic restoring region being embodied as an annular ring projecting inwards from the external sealing zone and being disposed in the indentation ring groove between the base and ring ribs of the indentation ring groove and the at least one external sealing zone, wherein the elastic restoring region and the at least one external sealing zone are formed in one piece of the same material; and
  a second sealing ring disposed on a respective backup ring, wherein the backup rings are oriented in different rotational positions and the sealing rings have the same shape.

2. The multi-piece valve disk according to claim 1, wherein parts of the valve disk are positively supported at the backup ring from two sides in axial directions defined by the direction of adjustment of the valve disk, and wherein the backup ring defines the clamping width of the ring groove of the valve disk so as to generate a preload frictional connection for the sealing ring via the support of the parts of the valve disk.

3. The multi-piece valve disk according to claim 1, wherein the backup ring defines the radial position of the sealing ring generating a protrusion of the external sealing zone over the valve disk via a radial support.

4. The multi-piece valve disk according to claim 1, wherein the sealing rings are fit onto differently designed backup rings in different rotational positions.

5. The multi-piece valve disk according to claim 1, wherein the sealing rings have different Shore hardnesses.

6. The multi-piece valve disk according to claim 1, wherein the backup ring is embodied divisibly from ring segments.

7. The multi-piece valve disk according to claim 1, wherein the sealing ring is embodied with bi-injection molding technology in one piece with zones of different Shore hardnesses.

8. The multi-piece valve disk according to claim 1, wherein the sealing ring comprises in a cross-section:
  two outer sides including free ends, the outer sides each becoming thicker towards the respective free end,
  a roof-like external sealing zone between the outer sides at an external surface,
  an inner ring groove internally adjacent to each of the outer sides, and
  at least one annular ring projecting inwards between the inner ring grooves.

9. The multi-piece valve disk according to claim 8, wherein, with the ring seal being mounted in the valve disk, open alternative spaces for the outer sides and the annular ring of the sealing ring are provided in the indentation of the backup ring, and between the backup ring and the parts of the valve disk that lie against the backup ring.

10. The multi-piece valve disk according to claim 8 wherein the backup ring comprises:
  a base part limited by orthogonal backup faces,
  two spaced ring ribs projecting from the base part and fitting in the inner ring grooves of the sealing ring, and
  an indentation embodied as a further ring groove between the ring ribs.

11. The multi-piece valve disk according to claim 10, wherein the backup ring is made of metal or of a harder material than that of the sealing ring.

12. The multi-piece valve disk according to claim 10, wherein in the backup ring, the ring ribs are offset inwards via external shoulders with respect to the base part.

* * * * *